: 3,227,774
SULFURIC ALKYLATION ACID RECOVERY
Arthur R. Goldsby, Chappaqua, N.Y., assignor to Texaco Development Corporation, New York, N.Y., a corporation of Delaware
Filed Jan. 21, 1965, Ser. No. 428,604
14 Claims. (Cl. 260—683.62)

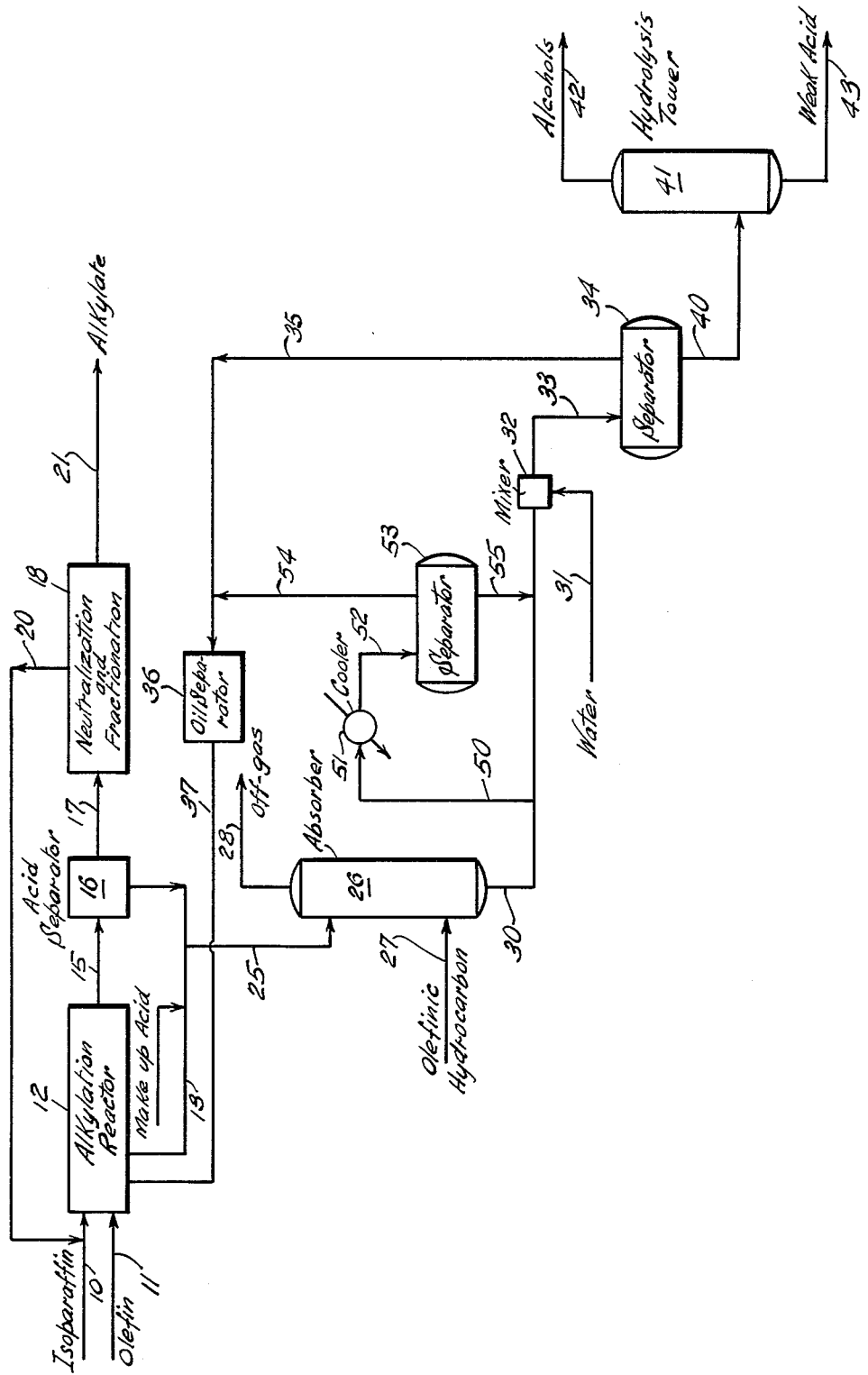

This application is a continuation-in-part of my copending application, Serial No. 213,984, filed August 1, 1962, now abandoned.

This invention is directed to a hydrocarbon conversion process. More particularly, it is directed to a method of alkylating an isoparaffin with olefin and olefinic feed stocks in the presence of a sulfuric acid catalyst wherein the catalyst is continuously revivified in use. In the course of the alkylation of isoparaffins with olefins, sulfuric acid catalyst becomes contaminated with a polymeric organic contaminant which impairs the catalyst activity. This contaminant is believed to be a product of conjunct polymerization, that is, polymerization of the reactants accompanied by hydrogen transfer reactions. This material is variously referred to as "acid oil," polymeric oil," "acid-soluble sludge," or as a "complex." It appears to be a complicated mixture, the exact composition of which is unknown. Its composition no doubt varies somewhat depending on the composition of the feed stock and the reaction conditions. This polymeric organic contaminant is soluble or chemically bound by strong sulfuric acid but is insoluble in acid diluted to less than about 50 percent acid by weight with water. In accordance with the usual procedures of the prior art, this organic polymeric contaminant is eliminated from the alkylation system by withdrawing acid of about 85 to 92 percent concentration as "spent acid" from the alkylation system and replenishing the system with fresh acid of about 98.0 to 99.9 percent acid. Since the polymeric organic contaminant amounts to only about 3 to 8 percent of the spent acid, a large amount of acid must be disposed of in order to eliminate a relatively small amount of the polymeric organic contaminant from the system. It has previously been attempted to separate the polymeric organic contaminant from the acid by various methods unsuccessfully, including the use of solvent extraction, contacting with a solid absorbent, salting out, vacuum distillation, and treatment with various chemicals. In accordance with the process of this invention, acid is recovered by converting a major portion to alkyl esters, the alkyl esters and polymeric organic contaminants are separated as an organic phase from an aqueous acid phase, the organic phase is treated to remove the polymeric organic contaminant, and the remaining ester is passed to the alkylation zone where upon contact with isoparaffin sulfuric acid is released. It appears that reaction of the olefin with the acid depletes the acid so that the remaining acid is further diluted by the water initially present and the contaminant is rendered less tightly held. Upon dilution of the acid, either by the depletion of a major portion of the acid by reaction with olefin, by the addition of water or by both, two phases are formed, an organic phase comprising dialkyl sulfates and at least a major portion of the polymeric organic contaminant, and an acid phase comprising remaining unreacted acid, water, and water soluble constituents, for example alkyl acid sulfates. In accordance with the process of this invention, a used alkylation acid containing polymeric organic contaminants is contacted with an olefin effecting formation of an obsorption product comprising dialkyl sulfate, said absorption product is separated into an acid phase and an organic phase comprising at least a portion of said dialkyl sulfate and at least a portion of said polymeric organic contaminants, said organic phase is treated effecting removal of polymeric organic contaminants and the thus treated organic phase is passed to an alkylation zone and contacted with isoparaffin and sulfuric acid alkylation catalyst.

In the catalytic alkylation of olefinic material with isoparaffins, a preponderance of isoparaffin (generally as much as 60 to 80 volume percent or more of the hydrocarbons in the reaction mixture) is used to direct the reaction towards production of the most valuable aviation or automotive fuels. Consequently a large quantity of isoparaffin must be recovered and recycled for reuse in the process. Isobutane is generally used as the isoparaffin for the manufacture of aviation or motor fuels although other isoparaffins, for example isopentane, may be employed.

In sulfuric acid alkylation, the mol ratio of isoparaffin to olefinic material supplied to the alkylation zone is maintained substantially in excess of 1 to 1, and preferably within the range of about 4 to about 20 to 1. The catalyst to liquid hydrocarbon volume ratio is maintained within the range of about 0.5 to 1 to about 5 to 1 and preferably within the range of about 1 to 1 to about 3 to 1. Catalyst strength in the alkylation zone is preferably maintained at least about 85% sulfuric acid strength.

An important part of the isobutane employed in alkylation processing is a recycle stream produced by fractional distillation of alkylation products in a deisobutanizing fractional distillation zone wherein the isobutane is recovered as a distillate fraction of high isobutane concentration, for example, about 85 to 95 liquid volume percent isobutane. The high-boiling alkylate in such distillation zone may be recovered as the bottoms fraction. This bottoms fraction may be further fractionated in conventional manner to separate light ends and alkylate fractions for use as fuel blending stocks. However, in most modern units, the alkylate produced is satisfactory for motor fuel without fractionation having an end point well below 400° F.

In accordance with the process of this invention the olefinic material reacted with an isoparaffin comprises a mixture of olefins and alkyl esters. The alkyl esters are produced by reaction of alkylation acid with olefin in a separate absorption step. Alkyl esters formed in the absorption step are separated and purified to remove catalyst contaminants and the purified ester is passed to the alkylation where it is converted to alkylate and released sulfuric acid.

Olefins, for example, propylene, butylenes, or mixtures of olefins, may be reacted with sulfuric acid, including acid of less than alkylation strength, to form alkyl esters. Olefins having at least three carbon atoms in the chain predominantly form branched chain esters, although a small amount of normal esters may be formed. The reaction mixture formed upon contacting a hydrocarbon stream containing mixed olefins with sulfuric acid comprises a complex mixture of mono- and diesters containing straight chain and branched chains. In the case of the diesters, the chains may be of the same or different lengths.

In maintaining catalyst strength in sulfuric acid catalyzed alkylation, it is generally necessary to withdraw acid at a rate of about 0.4 to 1.5 pounds per gallon of alkylate produced. The acid withdrawn may have a composition for example, of 90.0 weight percent $H_2SO_4$, 2.0 weight percent water and 4.4 weight percent polymeric organic contaminants. The purpose of withdrawing the spent acid is to reject the water and acid soluble oil, and this stream is reprocessed to recover the remaining acid. In accordance with the process of this invention, 60 to 90 percent of the sulfuric acid contained in spent acid is recovered in the form of dialkyl sulfates. Upon separation and alkylation of this dialkyl sulfate, sulfuric acid of 100 percent strength is liberated in the reaction zone so that the make up acid rate may be reduced to about 10 to 40 percent of that otherwise necessary.

Advantageously, spent sulfuric acid catalyst may be employed to extract alkylatable olefin from hydrocarbon streams in which the olefin is too dilute for inclusion directly in alkylation feed. For example, a hydrocarbon stream containing only about 10 to 30 percent propylene may be contacted with spent sulfuric acid catalyst to effect separation of the olefin as dipropyl sulfate from the remaining saturated hydrocarbons as well as from ethylene which is desirably excluded from alkylation feed to avoid excessive catalyst consumption. Olefin streams containing a higher percentage of propylene, such as those produced by catalytic cracking, are also suitable. Selective separation of propylene from ethylene containing streams is readily effected since the absorption rate of propylene in sulfuric acid is about 300 times that of ethylene for acid concentrations of 80 percent and higher. Nevertheless under some conditions some ethylene may be absorbed. An advantage of this process is that any ethylene which is absorbed in the absorption step forms compounds such as ethyl acid sulfate, which remain dissolved in the weak acid and are not passed to the alkylation zone.

The absorption step may be effected in contacting equipment well known in the art, for example, mixer-settlers, centrifugal contactors, or countercurrent towers. Counter-current contacting is preferred and is advantageously effected in countercurrent towers with either gaseous or liquid olefin containing hydrocarbon streams. In either case olefin containing hydrocarbon is introduced into the bottom of the tower and lean hydrocarbon is discharged from the top. Sulfuric acid introduced into the top of the tower is relatively strong effectively stripping remaining propylene from the exit hydrocarbon. As the acid descends through the column, it is consumed by reaction with olefin so that at the bottom of the tower the acid is relatively weak, and is rich in dialkyl sulfates. The relatively weak acid in contact with the most concentrated olefin tends to favor the formation of dialkyl sulfate by converting the alkyl acid sulfate to the diester. However, in some cases, it is advantageous to have the olefin in the top of a countercurrent tower contact acid containing some absorbed olefin, in order to minimize undesirable reactions of the olefins. Thus, the acid fed to the absorption zone may consist of used alkylation acid or may comprise a mixture of alkylation acid with a recycle stream of acid from the absorption or extraction step proportioned to effect efficient olefin absorption.

The absorption temperature is desirably maintained within a range of about 20 to 100° F. Since a substantial amount of heat is released upon absorption of olefins in acid, it is necessary to cool the absorption step to maintain the temperature within the desired range. Cooling of the absorption step is effected by cooling the feed streams to the absorption tower and/or by cooling material within the absorption step either by evaporative cooling or by indirect heat exchange methods. Liquid may be withdrawn from the absorption system, cooled by indirect heat exchange, and returned to the absorber. Coolant may be supplied by a separate refrigeration system or may be effected with a process stream. In one embodiment of this process, hydrocarbon effluent from the alkylation reaction zone is flashed, effecting vaporization of a part of the hydrocarbon liquid and cooling of the resulting liquid and vapor mixture. The resulting mixture is passed in indirect heat exchange with a stream of the absorption reaction mixture to effect cooling thereof. In another embodiment alkylation reaction mixture is flashed effecting cooling of the acid, for example, to about 20° F. The resulting cooled acid is passed to the absorber for reaction with olefin.

Absorption product comprising dialkyl sulfate, polymeric organic contaminants, and remaining unreacted acid is withdrawn from the absorption zone. The absorption product is separated into an organic phase comprising dialkyl sulfates and polymeric organic contaminants and an acid phase comprising diluted sulfuric acid and alkyl acid sulfates. The phase separation may be effected by extraction with a hydrocarbon solvent for example isobutane, by cooling the absorption product to a temperature below 40° F., for example, within the range of about 20 to 40° F., by adding additional water for dilution, or by a combination of the foregoing. Advantageously the absorption product may be cooled to separate a portion of the dialkyl sulfates and then water added to separate an additional portion of the organic phase. When cooling is used to separate part of the dialkyl sulfates, the remaining acid phase or a portion of it may be contacted with additional olefin before the water dilution step. The organic phase is separated from the dilute acid phase by gravity settling, for example sedimentation or by an accelerated separating technique, for example, by centrifugal separation.

In some cases, it is desirable to form an absorption mixture of olefins in used acid and then to extract the resulting alkyl sulfates from the depleted acid and acid soluble oil contaminants with a hydrocarbon solvent such as isobutane under conditions of relatively low selectivity. Under these conditions, a substantial amount of acid oil contaminant is extracted along with the alkyl esters. These conditions, for example, may be encountered when the olefin absorption is carried to the point where the remaining acid is depleted to a free acidity less than about 70 percent or when substantially complete extraction of alkyl esters is effected with a minimum of solvent. In these cases, the organic phase resulting from such extraction may be treated as described hereinafter to remove the acid oil contaminants.

The separated organic phase is then treated for removal of the polymeric organic contaminants. Advantageously the separated organic phase is treated by contacting with a solid absorbent such as alumina, charcoal, silica-gel, or a clay, or strong sulfuric acid, including used sulfuric acid alkylation catalyst. Strong sulfuric acid reacts with the polymeric organic contaminants to form a hydrocarbon insoluble product which is separated from the hydrocarbon by gravity separation. Alternatively, the polymeric organic contaminant may be separated by extraction with a liquid solvent, for example, propane or isobutane below a temperature of about 40° F., or by steam distillation or vacuum distillation. When distillation is employed, it is usually necessary to neutralize the organic phase by caustic and water washing to prevent decomposition in the course of distillation. Treated organic phase comprising dialkyl sulfate substantially free of the polymeric organic contaminant is passed to the alkylation zone to supply alkylation reactant as well as purified catalyst. Advantageously, the dialkyl sulfate may be combined with cold isobutene before it is passed to the alkylation zone.

In general, to obtain maximum recovery of spent alkylation acid, and also to obtain efficient use of the olefin charged to the absorption step, the maximum amount of olefin possible should be reacted with spent alkylation acid. Theoretically, this corresponds to two mols of olefin per mol of available sulfuric acid, giving 100% conversion of the acid to dialkyl sulfates.

The separated acid phase comprises dilute sulfuric acid and alkyl acid sulfates. The alkyl acid sulfates may be readily converted to alcohols by hydrolysis. The alcohol product is separated from remaining weak acid by distillation.

An object of this process is to provide an improved alkylation process. Another object is to provide a method of separating polymeric organic contaminants from an alkylation catalyst in an alkylation system. Another object is to recover spent sulfuric acid alkylation catalyst for reuse in alkylation. These and other objects will appear in the following description of the figure and example.

The accompanying drawing diagrammatically illustrates one form of the process of this invention. Although the drawing illustrates one arrangement of apparatus in which the process of this invention may be practiced, it is not intended to limit the invention to the particular apparatus or materials described.

Isobutane in line 10 and butylenes in line 11 are passed to alkylation reaction 12. Sulfuric acid catalyst is introduced into reactor 12 from line 13. The isobutane, butylenes and acid are contacted with vigorous agitation forming an emulsion. Effluent emulsion from reactor 12 is withdrawn through line 15 to acid separator 16. Separated acid catalyst is withdrawn through line 13 for return to the alkylation reactor and separated hydrocarbon is passed through line 17 to neutralization and fractionation facility 18. Separated isobuane is recycled through line 20 to the alkylation reactor with the fresh isobutane in line 10. Alkylate product is withdrawn through line 21.

A portion of the acid in line 13 is withdrawn through line 25 and introduced at the top of absorber 26. An olefinic hydrocarbon gas stream comprising predominantly propylene and propane, together with a small amount of ethylene, propane, butylenes and butanes is introduced into the bottom of absorber 26 through line 27. In absorber 26 propylene and butylenes are reacted with sulfuric acid forming dialkyl sulfates and remaining hydrocarbon including ethylene, propane and butane are discharged as off gas through line 28. Absorption product comprising dialkyl esters, polymeric organic contaminants and remaining unreacted acid is withdrawn through line 30.

Absorption product is combined with water from line 31 in mixer 32 and the mixture is passed through line 33 to separator 34. The mixture is kept cool by means not shown, if the absorption product is above about 40° F. Organic and acid phases are separated by sedimentation in separator 34. Organic phase is withdrawn through line 35 and passed to oil separator facility 36. In oil separator 36, the organic phase is contacted with clay effecting absorption of the polymeric organic contaminants. Treated organic phase comprising dry purified dialkyl sulfates are discharged through line 37 and passed to alkylation reactor 12.

Acid phase is withdrawn from separator 34 through line 40 and passed to hydrolysis tower 41. Dissolved alkyl acid esters are converted to the corresponding alcohols in hydrolysis tower 41 by heating and the resulting alcohols are distilled as a product and withdrawn through line 42. Remaining weak acid is discharged through line 43 for recovery and reconcentration, not shown.

Alternatively, at least a portion of the absorption product in line 30 may be passed through line 50 to cooler 51 and line 52 to separator 53. In separator 53 a portion of the dialkyl sulfates is separated and withdrawn through line 54 for treatment in admixture with the organic phase in line 35; in some cases, oil separator 36 may be by-passed and the separated dialkyl sulfates passed to line 37. Acid phase partially denuded of dialkyl sulfates is withdrawn from separator 53 through line 55 and returned to line 30 for treatment in the same manner as the absorption product by water dilution. When cooler 51 and separator 53 are used, additional cooling for mixer 32 is usually not required.

*Example*

In an example of the process of this invention, 710 barrels per day of butylenes and 14,200 barrels per day of isobutane are charged to an alkylation contactor together with 6115 pounds of 99.5 weight percent sulfuric acid and 44,981 pounds per day of dipropyl sulfate. The alkylation zone is maintained at a pressure of 60 p.s.i.g. and a temperature of 40° F. Alkylate product having an ASTM distillation range of 112° F. to 362° F. and an ASTM octane number of 94.7 is produced at a rate of 1407 barrels per day.

Acid of 92.0 percent acid concentration containing 3.9 weight percent polymeric organic contaminants is withdrawn from the alkylation system at a rate of 33,066 pounds per day and contacted with a gas stream containing propylene at a rate of 122 barrels per day of propylene in a counter-current absorption tower maintained at a maximum temperature of 60° F. by indirect heat exchange. Absorption product is diluted with 43,000 pounds per day of water and ice, and the mixture at about 45° F. passed to a gravity settler where organic and aqueous phases separate. Organic phase is contacted with charcoal effecting absorption of the polymeric organic contaminant. The treated dipropyl sulfate is passed to the alkylation zone. The charcoal is regenerated periodically by steaming and polymeric organic contaminant is recovered. Separated acid phase is distilled producing 890 pounds per day of isopropyl alcohol by hydrolysis and 5070 pounds per day of 30 percent sulfuric acid.

I claim:

1. In a process wherein an isoparaffin is alkylated with an olefin in the presence of a sulfuric acid catalyst in an alkylation zone wherein said catalyst becomes contaminated with polymeric organic material, the improvement which comprises:

contacting an olefin with used alkylation acid containing polymeric organic contaminants effecting formation of an absorption product comprising a dialkyl sulfate, separating said absorption product into an acid phase and an organic phase comprising said dialkyl sulfate and at least a portion of said polymeric organic contaminants, treating said organic phase effecting removal of polymeric organic contaminants therefrom, and passing thus treated organic phase to said alkylation zone.

2. The process of claim 1 wherein said organic phase is contacted with strong sulfuric acid effecting reaction between said sulfuric acid and at least a portion of said polymeric organic contaminants forming a hydrocarbon insoluble reaction product, and said hydrocarbon insoluble reaction product is separated from said organic phase.

3. The process of claim 1 wherein said organic phase is contacted with a solid absorbent effecting absorption of at least a portion of said polymeric organic contaminants.

4. The process of claim 3 wherein said solid absorbent is charcoal.

5. The process of claim 3 wherein a hydrocarbon is added to the separated organic phase and the resulting solution is contacted with said solid absorbent.

6. In a process wherein an isoparaffin is alkylated with an olefin in the presence of a sulfuric acid catalyst in an alkylation zone wherein said catalyst becomes contaminated with polymeric organic material, the improvement which comprises:

contacting an olefin with used alkylation acid and containing polymeric organic contaminants effecting formation of an absorption product comprising a dialkyl sulfate, cooling said absorption product to a temperature below about 40° F. effecting separation of said absorption product into an acid phase and an organic phase comprising at least a portion of said dialkyl sulfate and at least a portion of said polymeric contaminants, treating said organic phase effecting removal of polymeric organic contaminants therefrom, and passing thus treated organic phase to said alkylation zone.

7. In a process wherein an isoparaffin is alkylated with an olefin in the presence of a sulfuric acid catalyst in an alkylation zone wherein said catalyst becomes contaminated with polymeric organic material, the improvement which comprises:
contacting an olefin with used alkylation acid containing polymeric organic contaminants effecting formation of an absorption product comprising a dialkyl sulfate,
adding water to said absorption product effecting separation of said absorption product into an acid phase and an organic phase comprising said dialkyl sulfate and at least a portion of said polymeric organic contaminants,
treating said organic phase effecting removal of polymeric organic contaminants therefrom, and
passing thus treated organic phase to said alkylation zone.

8. The process of claim 7 wherein said organic phase is contacted with strong sulfuric acid effecting reaction between said sulfuric acid and at least a portion of said polymeric organic constituents forming a hydrocarbon-insoluble reaction product which is removed from said organic phase by gravity separation.

9. In a process wherein an isoparaffin is alkylated with an olefin in the presence of a sulfuric acid catalyst in an alkylation zone wherein said catalyst becomes contaminated with polymeric organic material, the improvement which comprises:
absorbing an olefin in used alkylation acid containing polymeric organic contaminants effecting formation of an absorption product comprising a dialkyl sulfate,
adding water to said adsorption product effecting separation of said absorption product into an acid phase comprising alkyl acid sulfate and dilute sulfuric acid and an organic phase comprising at least a portion of said dialkyl sulfate and at least a portion of said polymeric organic contaminants,
treating said organic phase effecting removal of polymeric organic contaminants therefrom,
passing thus treated organic phase to said alkylation zone,
subjecting said dilute sulfuric acid phase to hydrolysis effecting conversion of said alkyl acid sulfate to alcohol, and
separating said alcohol from dilute sulfuric acid.

10. In a process wherein an isoparaffin is alkylated with propylene and butylene in the presence of a sulfuric acid catalyst, the improvement which comprises:
contacting an olefinic feed stock comprising butylenes with an isoparaffin in the presence of a sulfuric acid catalyst in an alkylation zone wherein said catalyst becomes contaminated with polymeric organic material,
withdrawing a portion of said catalyst contaminated with polymeric organic materials,
contacting said catalyst contaminated with polymeric organic materials with an olefinic feed stock comprising propylene effecting formation of an absorption product comprising dipropyl sulfate,
separating said absorption product into an acid phase and an organic phase comprising said dipropyl sulfate and at least a portion of said polymeric organic contaminants,
treating said organic phase effecting removal of polymeric organic contaminants therefrom, and
passing thus treated organic phase comprising dipropyl sulfate to said alkylation zone.

11. In a process wherein an isoparaffin is alkylated with an olefin in the presence of a sulfuric acid catalyst in an alkylation zone wherein said catalyst becomes contaminated with polymeric organic material, the improvement which comprises:
contacting an olefin with used alkylation acid containing polymeric organic contaminants effecting formation of an absorption product comprising a dialkyl sulfate,
contacting said absorption product with a hydrocarbon solvent separating said absorption product into an acid phase and an organic phase comprising said hydrocarbon solvent, said dialkyl sulfate and at least a portion of said polymeric organic contaminants,
treating said organic phase effecting removal of polymeric organic contaminants therefrom, and
passing thus treated organic phase to said alkylation zone.

12. The process of claim 11 wherein said organic phase is contacted with strong sulfuric acid effecting reaction between said sulfuric acid and at least a portion of said polymeric organic contaminants forming a hydrocarbon insoluble reaction product, and said hydrocarbon insoluble reaction product is separated from said organic phase.

13. The process of claim 11 wherein said hydrocarbon solvent comprises isobutane.

14. The process of claim 12 wherein said strong sulfuric acid is used alkylation acid.

References Cited by the Examiner

UNITED STATES PATENTS

| | | | |
|---|---|---|---|
| 2,381,041 | 8/1945 | De Jong | 260—683.61 |
| 3,000,994 | 9/1961 | Watson | 260—683.61 |
| 3,038,948 | 6/1962 | Trow | 260—683.45 |
| 3,083,247 | 3/1963 | Goldsby et al. | 260—683.45 |

DELBERT E. GANTZ, *Primary Examiner.*